United States Patent [19]
Ingram

[11] 3,754,583
[45] Aug. 28, 1973

[54] INDEXING MECHANISM FOR DENTAL BLOCK WOOD MOLDING

[76] Inventor: Harry T. Ingram, 1800 Rankin St., Raleigh, N.C. 27604

[22] Filed: May 31, 1972

[21] Appl. No.: 258,323

[52] U.S. Cl............ 144/133 R, 83/278, 408/70, 144/198 R
[51] Int. Cl......... B27c 5/02, B27f 1/08, B27m 3/08
[58] Field of Search............ 144/133, 136, 198, 144/198 A; 83/278; 408/70

[56] References Cited
UNITED STATES PATENTS
146,649   1/1874   Bugbee ............................ 144/133 R
290,327   12/1883  Gould ............................. 144/133 R
2,779,590 1/1957   Seastrom ......................... 83/278 X Primary Examiner—Donald R. Schran
Attorney—B. B. Olive

[57] ABSTRACT

In a conventional radial arm type power saw adapted for dado cutting operations, an indexing mechanism is adapted to draw stock lumber past the sawing blades at predetermined evenly spaced intervals, and simultaneous with each spaced interval, is adapted to cause the saw to cut a notch of predetermined dimension in the stock lumber thereby continuously forming dental block wood molding.

7 Claims, 6 Drawing Figures

INDEXING MECHANISM FOR DENTAL BLOCK WOOD MOLDING

BACKGROUND OF THE INVENTION

1. Field of the Invention

This invention relates to lumber indexing devices useful with radial arm type power saws.

2. Description of the Prior Art

So-called dental block type wood molding comprises a length of relatively narrow rectangular molding into which a plurality of evenly spaced rectangular notches have been dado-cut. This type of molding has enjoyed widespread popularity and use as decorative ceiling, portal, and fireplace molding, particularly in Colonial and Georgian architecture, for a substantially large number of years. The conventional method of manufacturing dental block wood molding includes the use of a dado attachment, normally on a radial arm type power saw, and physically marking the lumber to be cut at the desired evenly spaced intervals. The lumber is then cut at the marked intervals by manually indexing the board past the saw, and cutting each notch individually. The conventional process is quite time consuming, causing the dental block molding to be priced comparatively higher than other moldings. In addition, manual indexing of lumber often leads to uneven spacing of notches. If, for example, an operator neglects to space an interval following the last notch cut and subsequently cuts a notch where there should have been a space, much time and finished work on that particular board are wasted.

In the manufacture of stringers for prefabricated stairs it has been known to manually index the stringer during formation of the grooves for the treads and risers. Such indexing apparatus operates on the principle of engaging the first groove after it has been cut by manual sighting of location and then indexing the stringer by predetermined amounts for the remaining grooves. This type of apparatus even though entirely manual has improved grooving of stair stringers. However, no practical cut engaging indexing apparatus of this general type has ever been developed so far as is known for either manual or automatic operation specifically for dental block notching.

It is therefore desirable out of cost as well as labor considerations to employ an apparatus adapted to rapidly and automatically index and dado-cut stock lumber at predetermined evenly-spaced intervals. With such an apparatus an operator would not only be capable of drastically increased productivity, but the chance for indexing mistakes and the resultant waste would be virtually eliminated.

SUMMARY OF THE INVENTION

In a radial arm type power saw adapted for dado cutting operation, an indexing mechanism for dental block wood molding utilizes an elongated arm slidably arranged for substantially rectilinear movement along the longitudinal axis of a workpiece, and having at one end a wedge-shaped tip adapted to engage dado-cut notched openings in the workpiece. After a first dado-cut is made in the workpiece the indexing mechanism of the present invention is adapted to provide audomatic indexing and cutting of subsequent evenly spaced notches. An indexing handle is adapted to advance the elongated arm, while an indexing adjustment mechanism determines the amount of advancement. A pair of rapid-acting hydraulic cylinders controlled by appropriate hydraulic valves and a timing mechanism, are mounted respectively on the indexing handle and on the movable sawing body of the radial arm saw, and are adapted to synchronously regulate a dado notch-cutting operation of the saw following each advancement of the workpiece, in a direction perpendicular to the saw path.

An object of the present invention is, therefore, to provide an apparatus adapted to index and dado-cut evenly spaced notches in stock lumber, thereby forming dental block wood molding.

Another object of the present invention is to provide an indexing mechanism for dental block wood molding which readily adapts to conventional radial arm type power saws.

Another object of the present invention is to provide an indexing mechanism for dental block wood molding which can function in either an automatic or manual operating mode.

These and other objects of the present invention will be perceived in the drawings, description and appended claims which follow.

DESCRIPTION OF THE PREFERRED EMBODIMENTS

Figure 1:
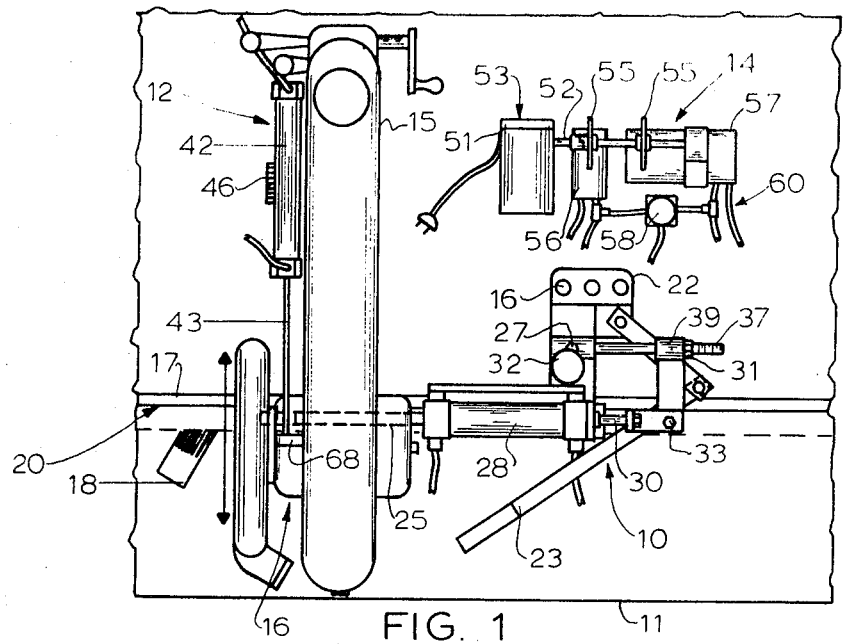
FIG. 1 is a top plan view of an apparatus built in accordance with the present invention, shown adapted for operation with a conventional radial arm saw.

Referring to FIG. 1 of the drawings, in a preferred embodiment the apparatus of the present invention is directed to an indexing mechanism for making dental block wood molding, adapted for use with a conventional radial arm type power saw 15 having dado cutting capabilities, and comprising an indexing portion, generally designated 10; a sawing portion, generally designated 12; and a timing portion, generally designated 14.

In a simplified description of operation, lumber to be cut into dental block molding is placed on a suitable worktable 11 beneath movable sawing arm 16 and between back guide 17 and retainer block 18. A first notch is then cut in the lumber by operating sawing arm 16. Indexing portion 10 is then adapted, simultaneous with the saw returning to a back, non-interfering position, to automatically engage the first cut notch and movably index the lumber a predetermined distance along the back guide axis 20. Fully automatic operation of the invention apparatus is achieved by timing portion 14 which hydraulically synchronizes a notch cutting operation following each respective indexed advancement of the lumber.

Figure 2:
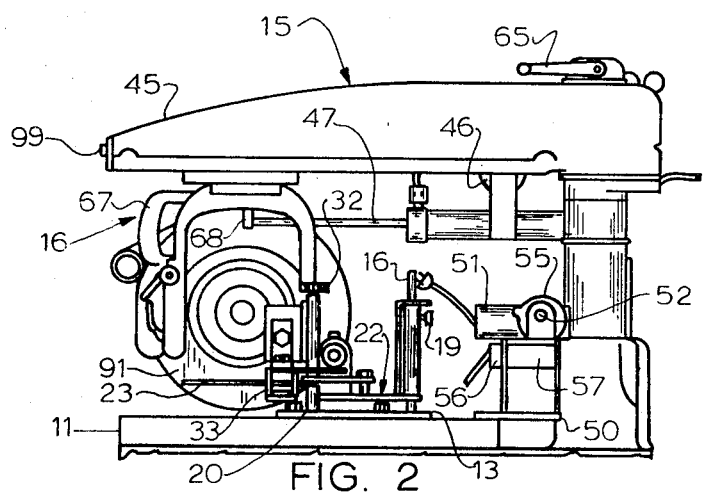
FIG. 2 is a side elevation of the indexing portion of the invention apparatus shown with reference to a radial arm saw.
Figure 3:
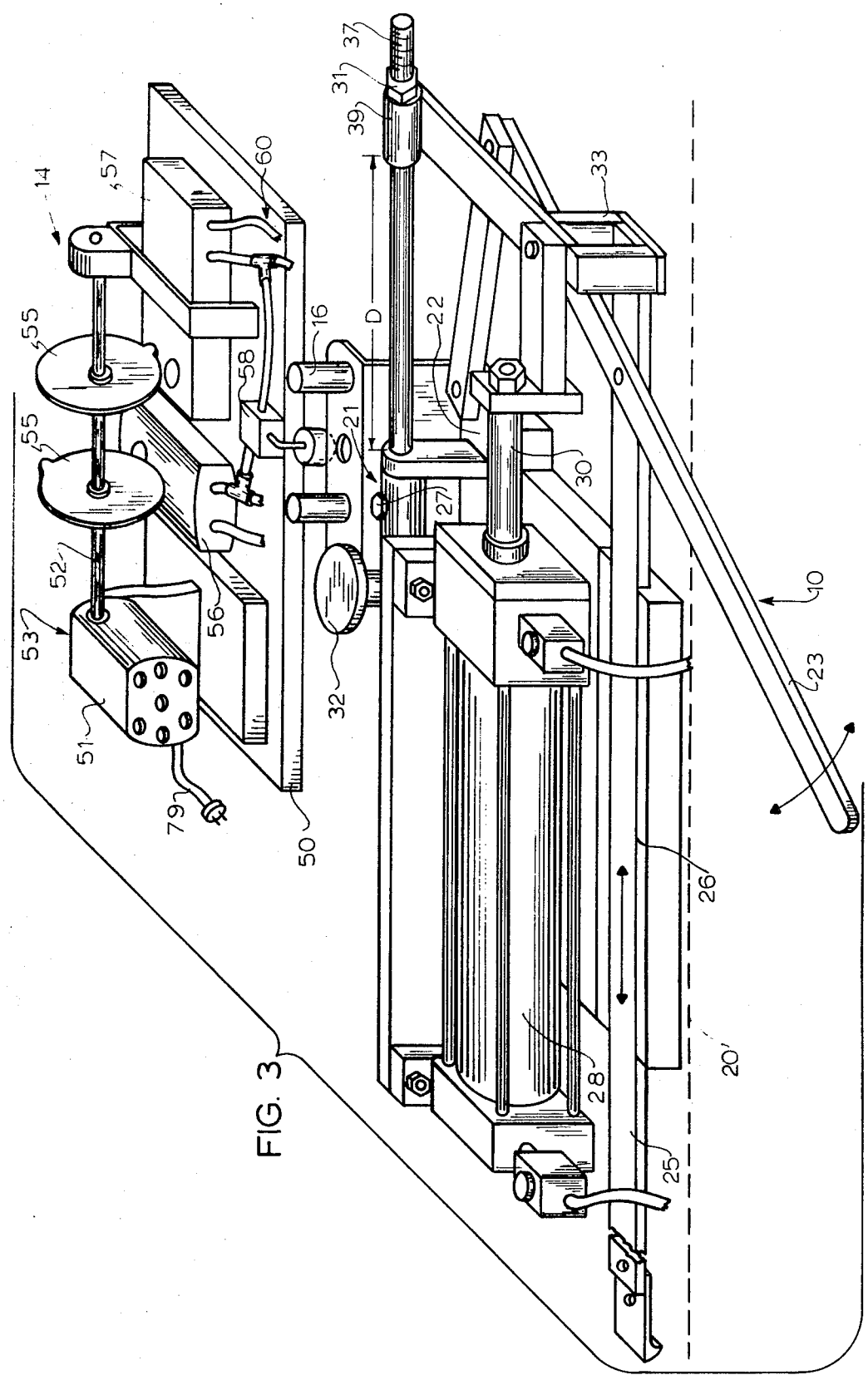
FIG. 3 is a perspective view of an automatic indexing portion of the present invention.

Referring more specifically to FIGS. 2 and 3 an indexing portion 10 according to the invention includes: a base 13 (FIG. 2) adapted to be secured to a worktable 11 and having two rods 16 extending vertically therefrom; a support member 22 adapted to reside on said base and be adjustably secured to rods 16 by an appropriate set screw 19 adapted to permit raising or lowering of support member 22 above the worktable 11 in order to accommodate lumber of varying size; an indexing handle 23, pivotally secured to said support member 22; and an indexing arm 25 (also indicated in FIG. 1 by dashed lines 25) secured at one end to a guide bracket 33, movably secured to indexing handle 23 and slidably arranged through grooves 26 (best shown in FIG. 3) in support member 22, for substantially rectilinear movement along axis 20; a hydraulic compressed air cylinder 28 removably secured by handscrew 32 to support member 22, having apropriate air inlet openings 29 and a piston operated sliding arm 30 secured to guide bracket 33. The indexing portion 10 of the preferred invention embodiment further includes an indexing adjustment, FIG. 3, comprising a partially threaded shaft 37 which is slidably secured at one end to an abutment means 21 by means of screw 27. At the opposite end, shaft 37 is slidably mounted in sleeve 39 which is secured to and moves with bracket 33. The stroke "D" controls the spacing between notches. Decreasing the distance D has the effect of limiting the outward movement of piston arm 30 which decreases the distance indexing arm 25 indexes each notch. When distance D is increased the distance between respective notches is increased. This distance can be changed either by loosening screw 27 and shifting shaft 37 or by adjusting nut 31.

Referring further to FIG. 3, a timing portion 14 of the invention apparatus comprises a suitable base 50 on which mounts an electric motor 51 including integral gear reduction means 53, and having a drive shaft 52 and a pair of cams 55 rotatably secured thereto, being adapted to sequentially operate hydraulic valves 56 and 57 also mounted on base 50. A suitable compressed air supply (not shown) provides pressurized air which flows through an oiling mechanism 58, adapted to include vaporized oil in the pressurized air stream to lubricate the various hydraulic parts, and then flows through valves 56 and 57. Communicating between valves 56, 57 are appropriate compressed air lines 60 which have here been only partially shown for purposes of better illustrating the key invention parts. It will suffice to state that a hydraulic compress air cylinder receives two air lines from a respective hydraulic valve in timing portion 14. Each valve simply regulates whether air going to a hydraulic cylinder enters the cylinder either ahead of or behind the movable piston, by causing air to flow in one or the opposite air lines 60. Correspondingly, the air line which is opposite the one supplying pressurized air to a hydraulic cylinder, is adapted to permit exit of previously used air, thus enabling rapid bi-directional control over movement of the hydraulic cylinder pistons, and respectively over the linear movement of sawing body 16 and indexing arm 25. Such "hydraulic" or "pneumatic" action is known.

Figure 4:
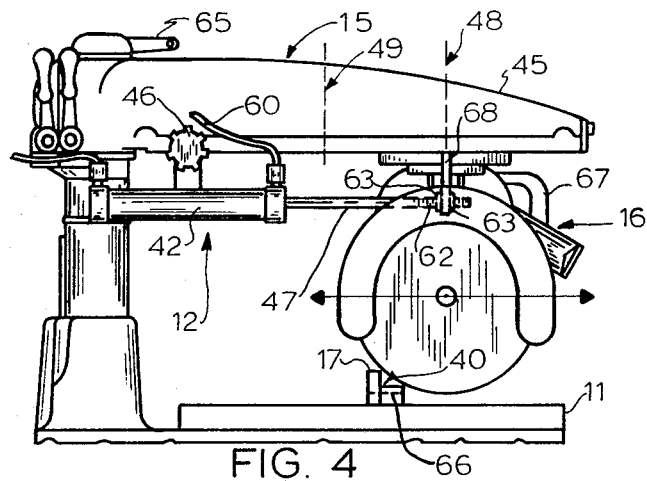
FIG. 4 is a side elevation of the invention apparatus as used on a radial arm saw, showing the location of a hydraulic cylinder adapted to operate the movable saw body.

Continuing with the description, referring now to FIG. 4 in a sawing portion 12 of the instant invention, a hydraulic or compressed air cylinder 42 is secured to cantilever arm 45 of radial arm saw 15, by an appropriate hand screw 46. Piston operated sliding arm 47 is secured to movable sawing body 16 by extending through an aperture in plate 68 which is adapted to be permanently secured to movable sawing body 16 by welding or the like. During operation of the sawing portion 12 of the present invention, hydaulic compressed air cylinder 42 is adapted to cause, with alternate pressurization of air lines 60, sawing body 16 to be moved to either a fully extended forward position as indicated by dashed lines 48, or to a rearmost position indicated by dashed lines 49, thereby cutting through stock lumber 40 placed against back guide 17. Provision is made for adjustment of the amount of linear travel of movable sawing body 16, by a threaded end 62 of the above described piston operated sliding arm 47 which is adapted to pass through an aperture (not shown) in plate 68. Appropriate nuts 63 are adapted for adjustable securement of threaded end 62 to plate 68. As is commonly provided on radial arm saws of conventional design, a suitable height adjustment crank 65 enables the operator to precisely determine the cutting depth of the saw, and in the case of the instant invention, the depth of each dado-cut notch, indicated by dashed lines 66. While it is herein contemplated that in an automatic mode of operation of the present invention, cylinder 42 actuates the movable sawing body 16, thereby automatically performing the actual dado cutting operations, by appropriate regulation of air lines 60, it is possible by shutting off the air pressure, to override the action of hydraulic cylinder 42 and to manually perform the dado cutting by appropriately moving saw handle 67.

Figure 5:
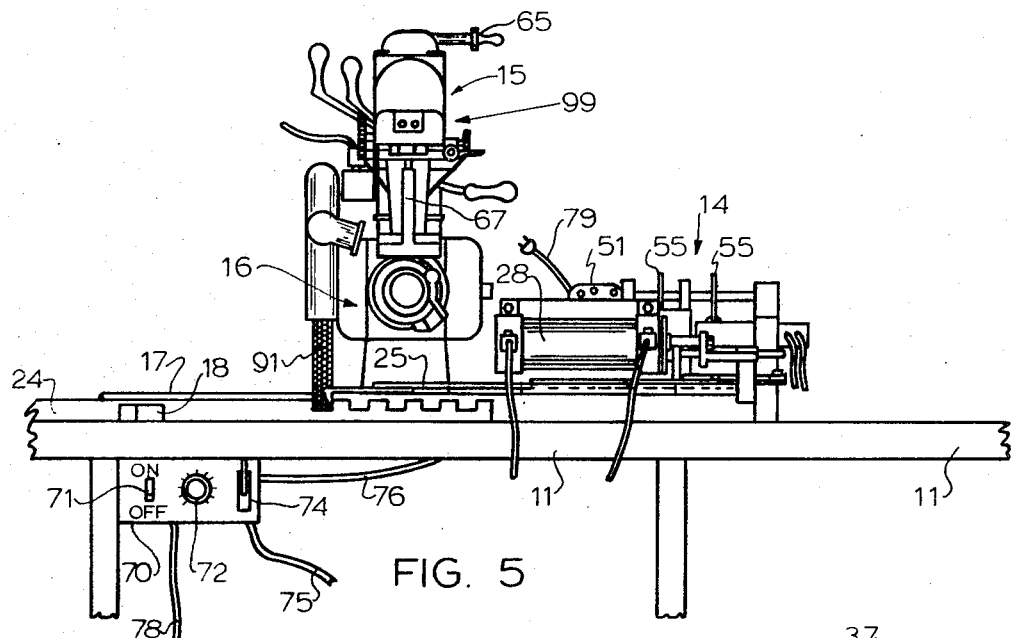
FIG. 5 is a front elevation of the complete invention apparatus shown with reference to a conventional radial arm saw.

Referring to FIG. 5, which shows the complete invention apparatus adapted for operation with a conventional radial arm saw 15, appropriate controls 70 are mounted within easy reach of an operator, preferably beneath worktable 11 and include an on/off switch 71, adapted to permit or alternately prevent the flow of current to motor 51 whose speed is voltage controllable; an adjustable voltage control means 72 adapted to adjustably govern the amount of voltage flowing to motor 51, thereby regulating the speed of said motor; and a manually operable hydraulic valve 74, which is adapted to control the flow of compressed air incoming through air line 75 from an appropriate compressed air supply (not shown), and flowing from valve 74 to timing portion 14 through communicating air line 76. Suitable power supply cords 78, 79 communicate motor 51 with controls 70, and controls 70 with an appropriate power supply (not shown).

Figure 6:
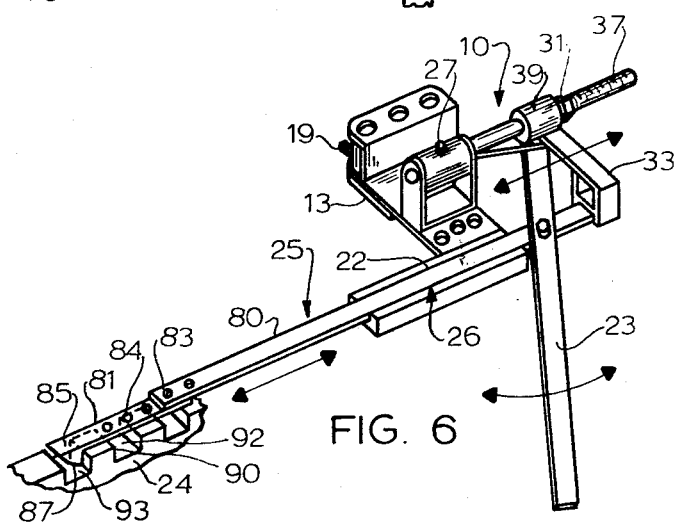
FIG. 6 is a perspective view of a manually operable embodiment of the invention.

Referring next to FIG. 6 which shows a detailed view of an alternate manually operable dental block indexing portion of the invention, indexing arm 25 comprises, as in the case of an automatic indexing portion of the preferred invention embodiment, two relatively thin, flat rectangular bars which are longitudinally adjustably secured together by appropriate screw securement means 83 and associated receiving holes 84. As previously stated, indexing arm 25 includes a wedge-shaped tip 85 at one end, adapted to engage dado-cut notches 93 in dental block wood molding after having just been cut. A wedge-shaped tip 85 according to the embodiment shown, is somewhat modified to include a curved under portion 87 which during operation is adapted to slide rearwardly toward the saw along a workpiece 24 (shown in cutaway), contacting rear edge portions 90 of the next to the last notch cut, be diverted vertically upwards from the said notch, glide over the spaced interval between the next to the last 92 and the last 93 notch cut, and to fall down into the last notch cut 93. A subsequent forward sliding action of indexing arm 25 is adapted to index the lumber workpiece precisely one predetermined spaced interval for cutting of the next notch. In the particular manually operable indexing portion embodiment shown wherein hydraulic cylinder 28 has been removed, an operator uses handle 23 to manually index a lumber workpiece predetermined evenly spaced intervals between the respective dado notch cutting operations.

Referring again to FIG. 5, during operation of the present invention apparatus in conjunction with a radial arm dado cutting saw of the class described and which has been adjusted to dado-cut a notch of predetermined dimensions, an operator typically selects either single or multiple lengths of stock lumber 24 which, for example, may be 1 inch high by 2 inches wide by 7 feet long, and places the lumber to be cut onto worktable 11 and against back guide 17. Appropriate connections to the power and pressurized air supplies are now made. A retainer block (see block 18, FIG. 1) having flexible finger-like projections at one end is then set at an angle to and in contact with the lumber to be cut. A slitted wooden block can be used for block 18. Block 18 is temporarily nailed in place on worktable 11. The flexible projections on block 18 are thus adapted to permit lumber to be indexed past saw 15 by the invention apparatus, (toward the right in FIG. 5) and to prevent lumber from being forced backwardly (toward the left in FIG. 5) by the action of indexing arm 25.

With switch 71 in the "off" position, current control at a minimum setting, and manually operable valve 74 in an "off" position, radial arm saw 15 is energized by appropriate operator controls 99. A first notch is now cut in workpiece 24 by either manually or automatically operating movable sawing body 16. Manual cutting of a first notch is accomplished by setting switch 71 and valve 74 to their respective "on" positions to allow indexing arm 25 to assume a position forward of and not interfering with the path of dado-saw blades 91. At this time, both switch 71 and valve 74 are returned to their respective "off" positions and the operator grasps saw handle 67, draws movable sawing body 16 from a back position forward through the lumber 24 dado cutting a notch, and then returns it to the original back position. Alternately, automatic cutting of a first notch proceeds as switch 71 and valve 74 are set to their respective "on" positions and current control 72 to a minimum position. Indexing arm 25, having no notch to engage will slide forwardly over the lumber, out of the way, enabling movable sawing body 16 to automatically cut through the lumber and return to a back position, as synchronized by the setting of cams 55.

In this mode of operation, once a first notch has been dado-cut in a given piece or pieces of lumber, current control 72 may be increased to an optimum indexing speed for the particlar lumber being cut. It is apparent that the invention apparatus will automatically index and cause to be rapidly dado-cut subsequent evenly spaced notches in the remaining length of the lumber. This occurs as indexing arm 25 is adapted to engage the first notch cut and index the lumber a predetermined distance whereupon the movable sawing body 16 is adapted to cut a next notch, the final result being a length of dental block wood molding.

It is important to note that when several widths of lumber are to be cut as in the case of simultaneous cutting and indexing of several boards, the speed of indexing must be accordingly lessened to allow the saw to adequately cut through the lumber and return to an original back position before the lumber is indexed. Conversely, single boards may be indexed at substantially higher speeds. Based on the above, it is apparent that the present invention apparatus provides a rapid, simple and efficient means to make dental block wood molding, using existing radial arm type sawing equipment. It has the added advantage of being operable in either fully automatic, partially automatic or manual modes of operation. The present invention is therefore capable of providing lower cost dental block molding in an absolute minimum amount of man and machine hours, and at the same time eliminating wasted lumber resulting from human error. Furthermore, the invention apparatus is readily removed or installed simply by removing the base plate which slidably mounts the indexing arm, its cylinder actuator and the motor cam-valve control and by removing the cylinder actuator which moves the saw blade. The radial saw is then restored to its normal condition.

The powered means for moving the indexing arm and consequently the work piece in a direction perpendicular to the saw path may be pneumatic, hydraulic fluid, electrical solenoid or equivalent actuating mechanisms. The control may also partake of corresponding forms. In whatever form the invention is employed it may be seen that for the first time the cabinet shops, mill work shops and similar operations are given a very rapid and economical tool for making dental block molding.

What is claimed is:

1. In combination with a radial wood saw of the type having a cantilevered arm supported above a worktable providing a work support surface, a saw support frame movable back and forth on said arm and a driven notching type saw blade supported on said saw frame and movable therewith along a path of cutting above and across the worktable surface, an auxiliary dental block molding indexing mechanism, comprising:

a. guide means fixed to the saw worktable surface and adapted to provide a fixed guide for sliding movement of an elongated dental block molding work piece in a fixed path perpendicular to the saw blade cutting path whereby said saw blade when moved in its path across the path of said work piece may notch the same;

b. an elongated indexing arm having a flexibly mounted tip portion, said indexing arm being slidably mounted at one end at a position laterally removed from the saw blade path and being adapted to move back and forth for a predetermined distance adapting said arm tip portion to move parallel to the direction of, above and to slide on the work piece; and c. means for actuating said indexing arm wherein said tip portion after a first notch has been cut in said work piece by said saw blade and while said saw blade is withdrawn may engage the leading edge of said first notch and advance said work piece along said guide means said predetermined distance and thereafter following each notching of the work piece may so engage each successive notch until said work piece has been fully notched to produce a dental mold block molding therefrom.

2. The combination of claim 1 including powered means for actuating the movement of said saw blade in its path, powered means for actuating the movement of said indexing arm in its path and control means supplying and coordinating the energization of said powered means whereby after said first notch has been cut said tip portion may engage the leading edge thereof and subsequent notching and indexing of the work piece may proceed automatically until completed.

3. The combination of claim 2 wherein said powered means comprise piston-cylinder type actuator means and said control means controls the supply and appropriate fluid energization thereof.

4. The combination of claim 1 including a pivotally mounted operator arm connected to manually actuate said indexing arm and adapting said indexing arm to be manually actuated in coordination with manual movement of the saw blade.

5. The combination of claim 2 including a pivotally mounted operator arm connected to manually actuate said indexing arm thereby enabling selective manual and automatic operation of said saw blade and indexing arm.

6. The combination of claim 3 wherein said powered means includes a first piston-cylinder type actuator removably mounted on the radial saw adjacent the cantilever arm thereof and adapted to move the saw blade support frame back and forth, a second piston-cylinder type actuator mounted on a base plate removably secured to the worktable of the radial saw and adapted to move said indexing arm back and forth, and a variable speed motor driven cam-valve type fluid control mounted on said base plate and adapted to energize and control said first and second said piston-cylinder type actuators, means to control said motor cam speed and means to adjust said predetermined distance whereby said indexing apparatus is readily installable on said radial saw without requiring modification thereof and when in operation is adjustable both in speed of operation and size of notches produced thereby.

7. The combination of claim 6 including a pivotally mounted operator arm connected to manually actuate said indexing arm thereby enabling selective manual and automatic operation of said saw blade and indexing arm.

* * * * *